S. N. Purse.

Hand Rake.

No. 3,398. Reissued April 20, 1869.

Witnesses,

Samuel B. Martin.
William H. Dunn

Inventor,

Samuel N. Purse

N. PETERS. PHOTO-LITHOGRAPHER, WASHINGTON, D. C.

UNITED STATES PATENT OFFICE.

OSCAR F. SMITH, OF WILLIAMSPORT, PENNSYLVANIA, (ASSIGNEE OF SAMUEL N. PURSE.)

IMPROVEMENT IN HARVESTERS.

Specification forming part of Letters Patent No. 26,616, dated December 27, 1859; reissue No. 3,398, dated April 20, 1869.

*To all whom it may concern:*

Be it known that SAMUEL N. PURSE, of Ashley, in the county of Pike and State of Missouri, have invented a new and useful Improvement in Harvesting-Machines, of which the following is a full, clear, and exact description, reference being had to the accompanying drawing making part of this specification, in which—

Figure 2:
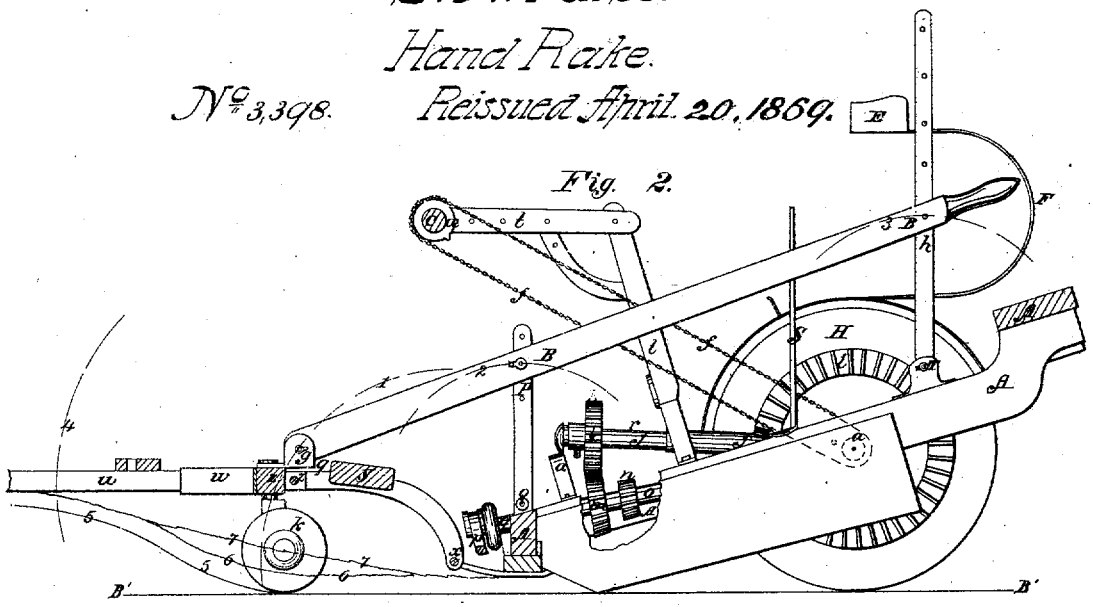
Figure 1:
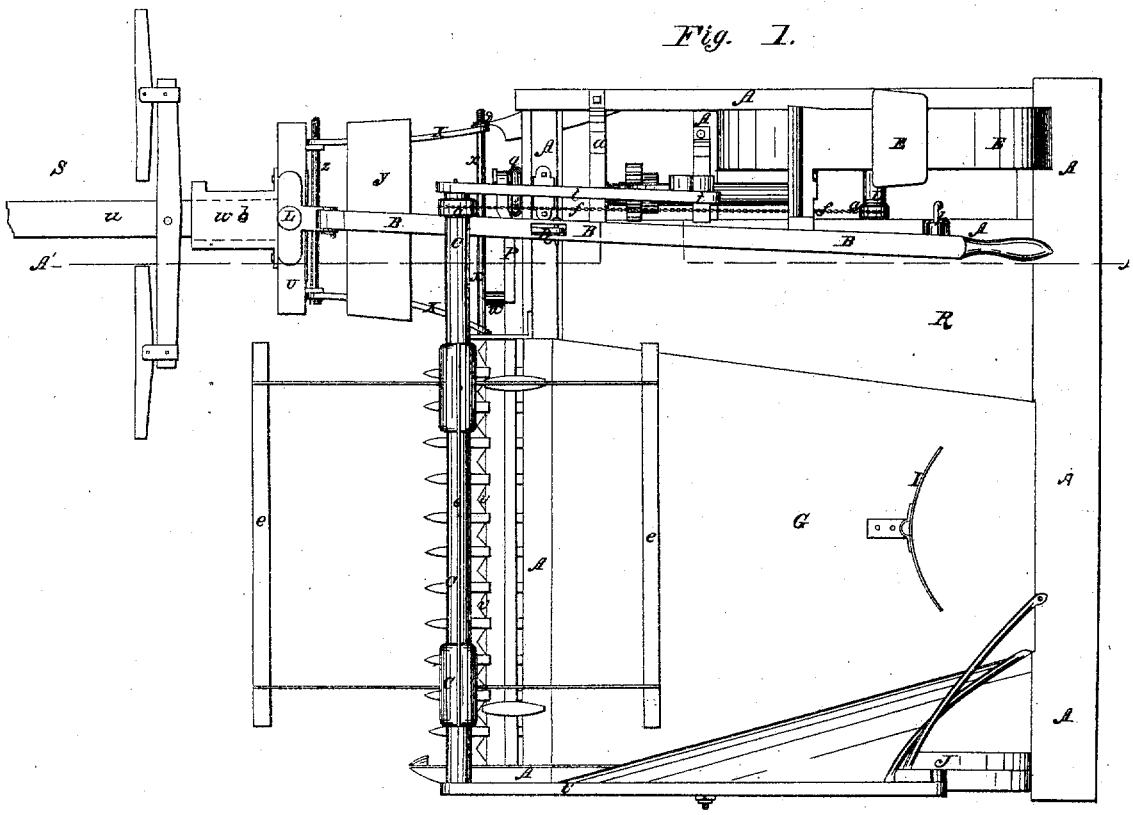

Figure 1 is a plan view of the machine; and Fig. 2, a section through A′ A′, Fig. 1.

The nature of the invention consists in a novel arrangement and combination of mechanism for changing the velocity of the knives, and will be readily understood from the following description with reference to the drawing, in which—

A is the main frame of the machine, mounted upon a pair of wheels, shown at J and H. To the inside of the wheel H a cog-wheel, *i*, is fixed, which meshes with a pinion fixed upon the shaft *j* at *j′*. This pinion is thrown in and out of gear with the wheel *i* by means of a lever, S. Upon the opposite end of the shaft *j* another pinion, *l*, is fixed, which meshes with a corresponding pinion, *m*, which drives the shaft O upon which it is fixed, and upon this shaft O a crank, *q*, is fixed, to which is connected the knives V V, at W, by means of the connecting-rod P, from whence the said knives receive their motion, which is of the ordinary reciprocating kind usually applied to harvesting-machines. The outer end of the shaft *j* is supported by means of a brace, shown at *a*, upon which a journal-box is fixed. The shaft *j* is set at an angle with the shaft O, and the wheel *l* is made to move back and forth upon a feather, so that it may be adjusted to mesh with the wheels *m* or *n*. The wheel *n* is made smaller than the wheel *m*, and the velocity of the shaft O will be increased whenever the driving-gear *l* is made to mesh with the wheel *n*, as will also the speed of the vibration of the knives, which is the object of adjusting the wheels and shafts in the manner described.

The rest of the machine to which the invention is applied is similar to other machines in use, and need not therefore be here described.

Having now described one good practical way in which the invention may be carried out in practice, what is claimed as the invention of SAMUEL N. PURSE, as an improvement in harvesting-machines, is—

1. Rotating the crank by means of either of two driven gears of unequal size for changing the rapidity of vibration of the cutters.
2. Two pinions on the crank-shaft, either of which may be made to rotate the same for varying the speed of the cutters.
3. So arranging the gearing that the speed of the vibration of the cutters may be changed without changing the direction of rotation of any of the gears.

OSCAR F. SMITH.

Witnesses:
J. H. MYERS,
H. D. GORDON.